2,811,498

VINYL CHLORIDE POLYMERS PLASTICIZED WITH A POLYCHLORO-DI-TERTIARY-BUTYL-BENZENE COMPOUND

Joseph Farrell Weiler, Elkins Park, Pa., assignor to Olin Mathieson Chemical Corporation, a corporation of Virginia No Drawing. Application March 17, 1953, Serial No. 342,969

3 Claims. (Cl. 260—33.8)

This invention relates to a novel class of polychlorinated aromatic compounds having particular value as solvents and plasticizers. The new compounds comprise an aromatic nucleus containing two tertiarybutyl radicals in which a substantial proportion of the hydrogen of the molecule is replaced by chlorine. The products contain about 40 percent or more of chlorine. Chlorine may be present in the ring and in the side chain but the latter appears to predominate. Preferably, no other substituents are present in the aromatic nucleus.

Suitable compounds which may be chlorinated to produce the polychloro compounds of this invention include ditertiarybutyl benzene. The products are oily liquids or solids mostly melting at near room temperature (20–30° C.).

The side chain chlorine atoms in the compounds of this invention possess unusual stability. For example, little if any side chain chlorine is lost when these compounds are refluxed for several hours with aqueous, alkaline potassium permanganate, with moist silver oxide in ether, or with alcoholic potassium hydroxide. Even chromic and nitric acids effect only incomplete oxidation.

The compounds of the present invention are particularly useful as solvents and as plasticizers in which application they impart good fire resistance to combustible polymers and substantially reduce water absorption. Polymers with which they are compatible include polyvinyl chloride. The polychloroditertiarybutyl benzene compounds are particularly effective as secondary plasticizers for polyvinyl chloride.

I generally prepare the polychloroditertiarybutyl benzene compounds by direct chlorination of the hydrocarbon in light. Other methods which may be used include reacting the hydrocarbon in the dark with sulfuryl chloride in the presence of a small amount of an organic peroxide. The chlorination in light is advantageously carried out at temperatures between about 50° C. and about 150° C. Side chain chlorination catalysts such as phosphorous trichloride may or may not be used as desired.

Any suitable equipment may be employed but for commercial operation a glass column surrounded by fluorescent lighting tubes and backed by a reflecting outer jacket is preferred. The operation may be carried out in a continuous manner by bubbling chlorine into the bottom of the column while circulating the material to be chlorinated therethrough. Means should be provided at the top of the column for withdrawal of hydrogen chloride gas formed as a by-product. The crude liquid produced is advantageously blown with air or other inert gas to free it of residual hydrogen chloride. It may be further purified, for example, by distillation, yielding fractions of various chlorine contents. While the polychloroditertiarybutyl benzene compounds are unusually stable compared to other compounds containing side chain chlorine, the distillation is best effected with addition of a suitable dehydrohalogenation inhibitor, for example, diphenyl amine, dimethyl aniline, alpha-nitroso-beta-naphthol or the like. About 0.1 to 0.2 percent of the inhibitor based on the weight of the material being distilled usually gives adequate protection against decomposition.

To produce compositions having a greater proportion of nuclear chlorine atoms, the chlorination is advantageously carried out in two stages, the benzene nucleus being chlorinated in the first stage and the tertiarybutyl side chains in the second. In the ring chlorination, when effected by elemental chlorine, the use of catalysts such as ferric chloride or antimony trichloride is generally advantageous.

The compounds of the present invention are especially useful as secondary, or non-solvent plasticizers for polyvinyl resins, for example, polyvinyl chloride and polyvinyl chloride-acetate co-polymers containing a small proportion of the acetate. Plasticizers for these resins are of two types. The primary or solvent type plasticizers are capable of replacing some of the polymer-polymer bonds of the resins by polymer-plasticizer bonds. Apparently by this means they lower the temperature at which the composition becomes flexible. Dioctyl phthalate is an example of a solvent type plasticizer for polyvinyl chloride. Non-solvent or secondary plasticizers do not have the solvent power of the primary plasticizers but serve as spacer materials only. Thus, though they do not plasticize when used alone, they serve usefully to extend the primary plasticizer and thus reduce the cost of plasticization. In addition, they modify the action of the primary plasticizers to a degree permitting tailoring of vinyl resins to particular uses. Satisfactory secondary plasticizers must not deleteriously affect the composition in any way. They must have many of the same physical properties as primary plasticizers, e. g., low volatility, light and thermal stability and compatibility.

The polychloroditertiarybutyl benzenes of this invention are outstanding in meeting all of the requirements for a secondary plasticizer. In using the polychloroditertiarybutyl benzene compounds of the present invention, the proportions depend on the properties desired in the final composition and, more particularly, on the proportion of primary plasticizer incorporated therein. For example, when sixty parts of dioctyl phthalate is used as primary plasticizer with 100 parts of polyvinyl chloride, about 15 parts of a polychloroditertiarybutyl benzene may also be incorporated without exceeding compatibility limits. Somewhat less plasticized, less flexible compositions are obtained with 30 parts of dioctyl phthalate per 100 parts of polyvinyl chloride. More extension of the plasticizer and better flame resistance may be obtained in such a composition since about 20 parts or more of chloroditertiarybutyl benzene is compatible therein. As the concentration of primary plasticizer is still further reduced, increasing amounts of the secondary plasticizer of the present invention may be incorporated. As much as about 60 parts of polychloroditertiarybutyl benzene is compatible with 100 parts of polyvinyl chloride in the absence of a primary plasticizer but the composition is stiff and essentially unplasticized. Other plasticizers commonly used for polyvinyl chloride, e. g., tricresyl phosphate and dioctyl adipate may be similarly extended by the compounds of the present invention.

My invention is further illustrated by the following examples:

Example I p-Ditertiarybutyl benzene was prepared by the action of tertiarybutyl chloride on benzene in the presence of anhydrous aluminum chloride. A melted charge of 312.5 grams of the p-ditertiarybutyl benzene was light chlorinated at 80–90° C., until the charge began to solidify.

The temperature was then raised to 130° C. and the chlorination continued until a total of 430 grams of chlorine had been absorbed. This represents about 6.5 atoms of chlorine per molecule. The product was aerated to remove hydrogen chloride and poured out to solidify.

*Example II*

A batch of 883 grams of p-ditertiarybutyl benzene was maintained at 110–120° C. and illuminated with a 200 watt incandescent bulb for a period of ten hours during which chlorine was introduced. The gain in weight was 867 grams. Chlorine efficiency was very high. The product was dissolved in ether, washed with water, dried with sodium sulfate and evaporated to obtain a product containing 49.3 per cent chlorine.

*Example III*

A 145.2 gram sample of p-ditertiarybutyl benzene was chlorinated in the illumination from a 200 watt incandescent light to a weight gain of 103.5 grams of chlorine. The temperature was 70–90° C. A portion of 111 grams was removed. The remaining portion was chlorinated for an additional 16 hours at 110° C. until 45.9 grams of additional chlorine had been absorbed. Both fractions were freed of dissolved gases and impurities by treating a hot benzene solution of the crude products with charcoal, filtering and stripping off the benzene. The first portion contained 41.84 percent chlorine and the second portion 51.30 percent chlorine.

*Example IV*

A solution of 190 grams of p-ditertiarybutyl benzene and 2.2 grams of antimony trichloride in 724 grams of carbon tetrachloride was chlorinated in the dark at 40–50° C. After 4.5 hours, 268.1 grams of chlorine had been absorbed. The solution was washed with water to remove hydrogen chloride and antimony chlorides and evaporated. The residue was separated into a solid melting at 225–7° C. and amounting to 149.3 grams. This apeared to be hexachlorobenzene formed by dealkylation. The major proportion of the product was 370.9 grams of oil containing 60.30 percent chlorine. It contained some residual carbon tetrachloride. On distillation at 10–11 mm., it boiled at 45 to 178° C.

*Example V*

An 883-gram portion of p-ditertiarybutyl benzene was chlorinated in the illumination of a 200 watt incandescent light at 80–120° C. to a weight increase of 100 percent. Most of the hydrogen chloride was removed by blowing with nitrogen for 3 hours. The liquid was dissolved in ether, washed with water, dried and evaporated to obtain 1550 grams of product containing 50.05 percent chlorine.

*Example VI* p-Ditertiarybutyl benzene was chlorinated under the illumination of a 200 watt incandescent lamp at temperatures up to 120° C., removing fractions from time to time. Each was dissolved in ether, washed with water, dried and evaporated to obtain solid products melting about room temperature and containing 35.81, 47.00, 60.52 and 65.87 percent chlorine. For purposes of the present invention the polychloroditertiarybutyl benzene compound contains at least about 40 percent of chlorine.

*Example VII*

To 100 parts by weight of polyvinyl chloride was added 40 parts of di-2-ethylhexyl adipate, 15 parts of the product of Example V, 4 parts of basic lead phosphate and 0.5 part of lead stearate. The composition was milled on hot rolls (front 350° F., back 250° F.) for five minutes, and the milled slab sheeted by pressing at 350° F. at 20,000 p. s. i. for two minutes. After 100 hours in a weatherometer, no changes were observable. The sheet was stable, flexible and self-extinguishing in six seconds.

I claim:

1. A plastic composition comprising a vinyl chloride polymer and a plasticizer which is a polychloro-di-tertiary-butyl-benzene compound containing at least about 40% chlorine.

2. The composition of claim 1 in which the vinyl chloride polymer is polyvinyl chloride.

3. The composition of claim 1 in which the vinyl chloride polymer is a vinyl chloride-vinyl acetate copolymer.

References Cited in the file of this patent

UNITED STATES PATENTS

| | | |
|---|---|---|
| 2,378,160 | Ruben | June 12, 1945 |
| 2,465,900 | McBee et al. | Mar. 29, 1949 |
| 2,521,850 | Johnson et al. | Sept. 12, 1950 |
| 2,615,859 | Gislon | Oct. 28, 1952 |